US010730571B2

(12) United States Patent
Mizusawa et al.

(10) Patent No.: US 10,730,571 B2
(45) Date of Patent: Aug. 4, 2020

(54) CRAWLER

(71) Applicant: BRIDGESTONE CORPORATION, Chuo-ku, Tokyo (JP)

(72) Inventors: Takashi Mizusawa, Tokyo (JP); Shingo Sugihara, Tokyo (JP); Kenji Tateishi, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 49 days.

(21) Appl. No.: 15/577,346

(22) PCT Filed: May 31, 2016

(86) PCT No.: PCT/JP2016/066043
§ 371 (c)(1),
(2) Date: Nov. 28, 2017

(87) PCT Pub. No.: WO2016/194904
PCT Pub. Date: Dec. 8, 2016

(65) Prior Publication Data
US 2018/0148110 A1 May 31, 2018

(30) Foreign Application Priority Data

Jun. 5, 2015 (JP) .................. 2015-114711

(51) Int. Cl.
*B62D 55/24* (2006.01)
*B62D 55/253* (2006.01)
*B62D 55/14* (2006.01)

(52) U.S. Cl.
CPC ........... *B62D 55/244* (2013.01); *B62D 55/14* (2013.01); *B62D 55/253* (2013.01)

(58) Field of Classification Search
CPC ..... B62B 55/24; B62B 55/244; B62B 55/253; B29D 29/08
See application file for complete search history.

(56) References Cited

U.S. PATENT DOCUMENTS 4,407,550 A * 10/1983 Lapsys .................. B62D 55/24
305/157
6,267,458 B1 7/2001 Hansen et al.
(Continued)

FOREIGN PATENT DOCUMENTS

CN 1789061 A 6/2006
CN 101374718 A 2/2009
(Continued)

OTHER PUBLICATIONS

International Search Report issued in International Application No. PCT/JP2016/066043 dated Jul. 19, 2016.
(Continued)

*Primary Examiner* — Jason R Bellinger
(74) *Attorney, Agent, or Firm* — SOLARIS Intellectual Property Group, PLLC

(57) ABSTRACT

A crawler includes a crawler main body (a rubber crawler main body (12)), a tensile body (70), guide protrusions (16), and flat surfaces (40). The tensile body (70) is provided with a flat portion (72) that is arranged along a width direction of the crawler main body and a slanting portion (74) that is slanted and arranged at a width direction outer side of the crawler main body relative to the flat portion (72). The guide protrusions (16) are formed at an inner peripheral face of the crawler main body at a width direction middle portion of the crawler main body. The flat surfaces (40) are formed at the width direction outer sides of the crawler main body relative to the guide protrusions (16). Turning wheels (a driving wheel (100), an idling wheel (102) and rolling wheels (104)) provided at a vehicle roll on the flat surfaces (40). In a linear region of the crawler main body as seen in a side view of the crawler main body, if a thickness from an imaginary plane projected from the flat portion (72) in the width direction of the crawler main body to an end edge at a crawler main body width direction outer side of the slanting portion (74) is
(Continued)

represented by L, then a result of subtracting a turning direction length of the crawler main body at the flat portion (72) from a turning direction length of the crawler main body at the slanting portion (74) is less than $2\pi L$.

8 Claims, 6 Drawing Sheets

(56) References Cited

U.S. PATENT DOCUMENTS

| | | | |
|---|---|---|---|
| 6,402,268 B1 | 6/2002 | Lussier | |
| 7,077,485 B2 * | 7/2006 | Akiyama | B62D 55/24 |
| | | | 305/165 |
| 8,567,877 B2 * | 10/2013 | Ijiri | B62D 55/244 |
| | | | 305/166 |
| 2004/0224118 A1 * | 11/2004 | Tsuru | B62D 55/244 |
| | | | 428/58 |
| 2007/0252433 A1 | 11/2007 | Fujita | |
| 2009/0195062 A1 | 8/2009 | Uchida | |
| 2009/0302677 A1 | 12/2009 | Sugihara | |
| 2010/0096915 A1 | 4/2010 | Hagio | |
| 2018/0148110 A1 | 5/2018 | Mizusawa et al. | |

FOREIGN PATENT DOCUMENTS

| | | | | |
|---|---|---|---|---|
| CN | 101472785 A | 7/2009 | | |
| JP | 406234379 A | * 8/1994 | ........... | B62D 55/253 |
| JP | 2004-161193 A | 6/2004 | | |
| JP | 2007-001332 A | 1/2007 | | |
| JP | 2003-182660 A | 7/2013 | | |
| WO | 0114202 A1 | 3/2001 | | |
| WO | 2005/073060 A1 | 9/2007 | | |
| WO | 2008/096749 A1 | 5/2010 | | |
| WO | 2016/194904 A1 | 12/2016 | | |

OTHER PUBLICATIONS

Examination Search Report of the Canadian office action dated Aug. 29, 2018, from the CIPO in a Canadian patent application corresponding to the instant patent application.

Search Report of the Chinese office action dated Dec. 14, 2018, from the SIPO in a Chinese patent application corresponding to the instant patent application.

* cited by examiner

CRAWLER

CROSS REFERENCE TO RELATED APPLICATIONS

The present application is a U.S. national stage application of application PCT/JP2016/066043, which was filed May 31, 2016, which claims priority to Japanese Patent Application 2015-114711, which was filed on Jun. 5, 2015. The present application hereby incorporates by reference both applications referenced above.

TECHNICAL FIELD

The present invention relates to a crawler.

BACKGROUND ART

A crawler has been disclosed (for example, see Japanese Patent Application Laid-Open (JP-A) No. 2004-161193) in which an inner peripheral face of the crawler is slanted, in order to suppress meandering of the crawler during running on uneven ground and during steering. Thus, progression performance of the vehicle is improved.

SUMMARY OF INVENTION

Technical Problem

However, according to JP-A No. 2004-161193, the inner peripheral face of the crawler is a wheel rolling surface for rolling wheels. Because the whole of the inner peripheral face is slanted, torsional forces when the inner peripheral face wraps onto a driving wheel and an idling wheel, pressure forces from the rolling wheels, and so forth may be applied in a localized manner. In consideration of the circumstances described above, an object of embodiments of the present invention is to both moderate forces that are applied to a crawler in a localized manner and suppress meandering of the crawler.

Solution to Problem

A crawler according to a first aspect of the present invention includes a crawler main body formed by a resilient body having an endless belt shape, a tensile body that is wound along a turning direction of the crawler main body and is embedded in the crawler main body, the tensile body including, in a sectional view of a thickness direction of the crawler main body, a flat portion that is arranged along a width direction of the crawler main body, and a slanting portion that is slanted and arranged at a width direction outer side of the crawler main body relative to the flat portion, guide protrusions that are formed at an inner peripheral face of the crawler main body at a width direction middle portion of the crawler main body, the guide protrusions being formed at intervals in the turning direction of the crawler main body, and a flat surface on which turning wheels provided at a vehicle roll, the flat surface being formed at the inner peripheral face of the crawler main body at the width direction outer side of the crawler main body relative to the guide protrusions, wherein, in a linear region of the crawler main body as seen in a side view of the crawler main body, if a thickness from an imaginary plane projected in the width direction of the crawler main body from the flat portion to an end edge of the slanting portion at the width direction outer side of the crawler main body is represented by L, then a result of subtracting a turning direction length of the crawler main body at the flat portion from a turning direction length of the crawler main body at the slanting portion is less than $2\pi L$.

In the crawler according to the first aspect of the present invention, in the linear region as seen in the side view of the crawler main body, the thickness from the imaginary plane projected in the crawler main body width direction from the flat portion of the tensile body to the crawler main body width direction outer end edge of the slanting portion of the tensile body, is L. If a radius of curvature of the flat portion in a curved region as seen in the side view of the crawler main body (a region that is wrapped around the driving wheel or the idling wheel) is represented by R, and an inter-axis distance between respective rotation axes of the driving wheel and idling wheel is represented by 1, the turning direction length (circumferential length) of the crawler main body at the flat portion is expressed by $2\pi R + 2l$. If the thickness from the imaginary plane projected in the crawler main body width direction from the flat portion of the tensile body to the crawler main body width direction outer end edge of the slanting portion of the tensile body was L in the curved region as seen in the side view of the crawler main body too, the circumferential length of the crawler main body width direction outer end edge of the slanting portion would be expressed by $2\pi(R+L) + 2l$. In this situation, the result of subtracting the circumferential length at the flat portion from the circumferential length at the crawler main body width direction outer end edge of the slanting portion would be expressed by $2\pi L$. In the crawler according to the first aspect of the present invention, the result of subtracting the circumferential length at the flat portion from the circumferential length at the crawler main body width direction outer end edge of the slanting portion is less than $2\pi L$. Therefore, in the curved region, the thickness from the imaginary plane projected in the crawler main body width direction from the flat portion of the tensile body to the crawler main body width direction outer end edge of the slanting portion of the tensile body is smaller than L. Consequently, according to the crawler of the first aspect of the invention, when the crawler turns and the slanting portion of the tensile body moves from the linear region to the curved region, a width direction end portion of the crawler main body is pulled and inflected to the inner peripheral side of the crawler main body by the tensile body. Thus, the inner peripheral face of the width direction end portion of the crawler main body is slanted toward the inner peripheral side of the crawler main body. If the crawler starts to meander, relative positions of the driving wheel and idling wheel relative to the crawler main body in the width direction of the crawler main body are offset. Thus, the driving wheel and idling wheel press against the slanted face that is formed at the inner peripheral face of the crawler main body at one side of the crawler width direction. Correspondingly, the resilient body at the outer peripheral side of the crawler main body at the slanted face pushes against the tensile body, as a result of which tension is produced in the tensile body at the one side of the crawler main body width direction, and a difference in tension is produced between an inner side of the crawler main body width direction and an outer side at the one side. Accordingly, the crawler main body moves toward the one side of the crawler main body width direction, at which the tension is higher, so as to eliminate the difference in tension in the tensile body. As a result, the relative positions of crawler main body width direction centers of the driving wheel and the idling wheel align with the center of the crawler main body in the width direction. Thus, meandering of the crawler may be suppressed. Furthermore, rolling wheels roll on the flat surface in a linear region as seen in the side view of the crawler main body. Localized forces applied to the crawler inner peripheral face from the rolling wheels may be moderated compared to a crawler in which the whole of a wheel rolling surface is a slanted face. Consequently, damage to the crawler inner peripheral face is suppressed.

In a crawler according to a second aspect of the present invention, in the crawler of the first aspect, the crawler turning direction length at the slanting portion is the same as the crawler turning direction length at the flat portion.

According to the crawler of the second aspect of the present invention, because the lengths of the slanting portion and the flat portion in the turning direction of the crawler main body are the same, when the crawler turns and the slanting portion of the tensile member moves from the linear region to the curved region, the slanting portion that is slanted toward the crawler outer peripheral side is pulled to the crawler inner peripheral side by tension in the tensile member and slants toward the inner peripheral side. Accordingly, an angle at which the inner peripheral face of the width direction end portion of the crawler main body slants toward the inner peripheral side of the crawler main body is large. As a result, the effect of suppressing meandering of the crawler main body may be enhanced.

In a crawler according to a third aspect of the present invention, in the crawler of the first aspect or the second aspect, in the linear region as seen in the side view of the crawler main body in a state in which the crawler main body is wrapped around a driving wheel and an idling wheel provided at the vehicle, a distance between the slanting portion at a width direction outer end portion of the crawler main body and the flat portion is at least 0.1% of a distance between rotation axes of the driving wheel and the idling wheel.

According to the crawler of the third aspect of the present invention, compared to a structure in which the distance in a linear region between the width direction outer end portion of the crawler main body at the slanting portion and the flat portion is less than 0.1% of the distance between the rotation axes of the driving wheel and the idling wheel, the slanting portion in the curved regions against which the driving wheel and idling wheel touch is pulled more strongly to the crawler inner peripheral side, by the slanting portion of the tensile member in the linear regions of the crawler main body. Therefore, the effect of the crawler main body being inflected toward the inner peripheral side of the crawler main body by the tensile body is enhanced.

In a crawler according to a fourth aspect of the present invention, in the crawler of any one of the first to third aspects, the crawler is a coreless crawler that is not provided with a core.

Because the crawler according to the fourth aspect of the present invention is not equipped with a core, bending rigidity of the crawler main body is less than in a crawler equipped with a core. Therefore, in each curved region as seen in the side view of the crawler main body, when the tensile body is slanted toward the inner peripheral side of the crawler main body, the crawler main body deforms easily. Consequently, the flat surface formed at the inner peripheral face of the crawler main body is easily slanted to the inner peripheral side of the crawler main body. As a result, the guide protrusions of the crawler are easily pushed back towards the centers of the driving wheel and idling wheel. Thus, the effect of suppressing meandering of the crawler may be enhanced.

Advantageous Effects of Invention

According to a resilient crawler relating to the present aspects, meandering of the crawler may be suppressed even while forces that are applied to the crawler in a localized manner are moderated.

DESCRIPTION OF EMBODIMENTS

First Exemplary Embodiment

Here below, a rubber crawler 92 is described with reference to the attached drawings. The rubber crawler 92 serves as an example of a crawler according to a first exemplary embodiment of the present invention.

Figure 1:
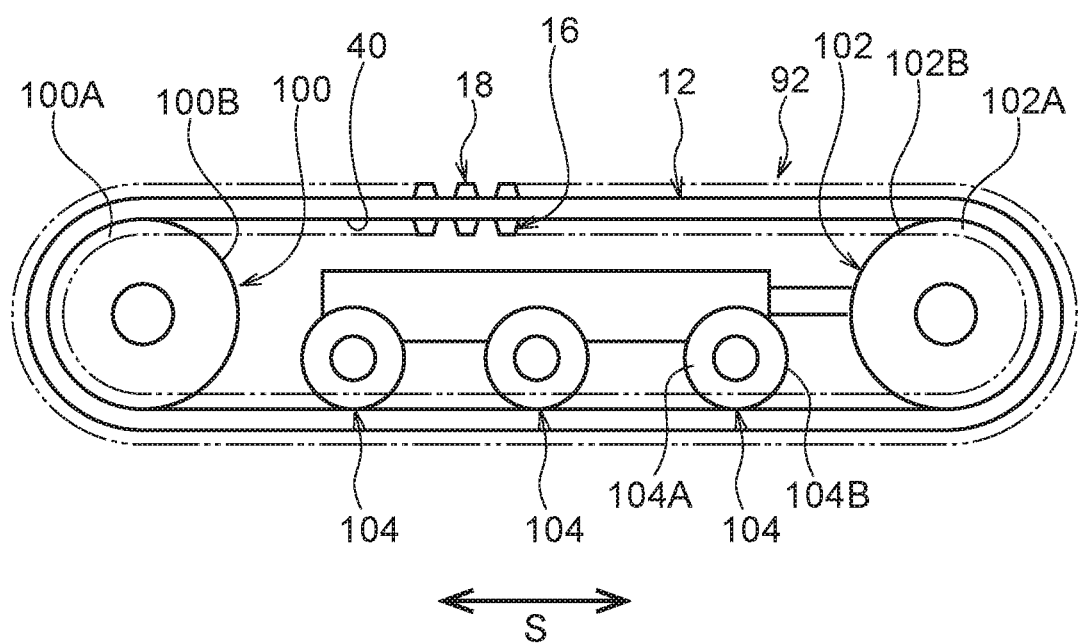
FIG. 1 is a sectional diagram showing a state in which a crawler according to a first exemplary embodiment of the present invention is wrapped around a driving wheel and an idling wheel.

As shown in FIG. 1, the rubber crawler 92 according to the present exemplary embodiment is wrapped around a driving wheel 100 and an idling wheel 102 for use. The driving wheel 100 is linked to a driving axle of a crawler vehicle that serves as a machine body. The idling wheel 102 is mounted to the crawler vehicle to be freely turnable. Plural rolling wheels 104 are disposed between the driving wheel 100 and idling wheel 102 and are mounted to the crawler vehicle to be freely turnable. The rolling wheels 104 roll on an inner peripheral face of the rubber crawler 92. The driving wheel 100, idling wheel 102 and rolling wheels 104 according to the present invention are examples of turning wheels of the present invention.

In the present exemplary embodiment, a turning direction of the endless-type rubber crawler 92 (the direction of arrow S in FIG. 1) is referred to as "the crawler turning direction" and a width direction of the rubber crawler 92 (the direction of arrow W in FIG. 2A) is referred to as "the crawler width direction". In the present exemplary embodiment, the rubber crawler 92 is formed in an annular shape that is wrapped around the driving wheel 100 and idling wheel 102. The inner peripheral side of the rubber crawler 92 (the side in the direction of arrow IN in FIG. 2A) is referred to as the "crawler inner peripheral side" and the outer peripheral side of the rubber crawler 92 (the side in the direction of arrow OUT in FIG. 2A) is referred to as the "crawler outer peripheral side". Note that the direction of arrow IN in FIG. 2A (the inner side direction of the annular shape) and the direction of arrow OUT (the outer side direction of the annular shape) represent inner and outer directions of the rubber crawler 92 in the wrapped state.

As shown in FIG. 1, the driving wheel 100 includes a pair of wheel portions 100A in circular disc shapes that are linked to the driving axle of the crawler vehicle. Outer peripheral surfaces 100B of the wheel portions 100A touch against and roll on wheel rolling surfaces 40 of the rubber crawler 92, which are described below. Pin portions (not shown in the drawings) are formed at the pair of wheel portions 100A with a constant spacing in the circumferential direction of the wheel portions 100A so as to span between peripheral edge portions of the wheel portions 100A. The pin portions engage (mesh) with guide protrusions 16, which are described below. By engaging with the guide protrusions 16, the pin portions transmit driving force from the crawler vehicle to the rubber crawler 92.

The idling wheel 102 includes a pair of wheel portions 102A in circular disc shapes, which are mounted to the crawler vehicle to be freely turnable. Outer peripheral surfaces 102B of the wheel portions 102A touch against and roll on the wheel rolling surfaces 40 of the rubber crawler 92 that are described below. The idling wheel 102 is pushed in a direction away from the driving wheel 100 by a pressure mechanism such as a hydraulic mechanism or the like provided at the vehicle body side, which is not shown in the drawing. Thus, the idling wheel 102 is pressed against the wheel rolling surfaces 40 of the rubber crawler 92 and maintains tension (tensile force) in the rubber crawler 92. The rubber crawler 92 to which driving force is transmitted cycles between the driving wheel 100 and the idling wheel 102. As a result of the cycling of the rubber crawler 92, lugs 18, which are described below, engage with a ground surface and the crawler vehicle moves (runs).

As shown in FIG. 1, the rolling wheels 104 support the weight of the crawler vehicle. Each rolling wheel 104 includes a pair of wheel portions 104A in circular disc shapes, which are mounted to the crawler vehicle to be freely turnable. Outer peripheral surfaces 104B of the wheel portions 104A roll on the wheel rolling surfaces 40 of the rubber crawler 92 that are described below.

The idling wheel 102 and the rolling wheels 104 are passively turned by the rubber crawler 92.

(Rubber Crawler)

Figure 2A:
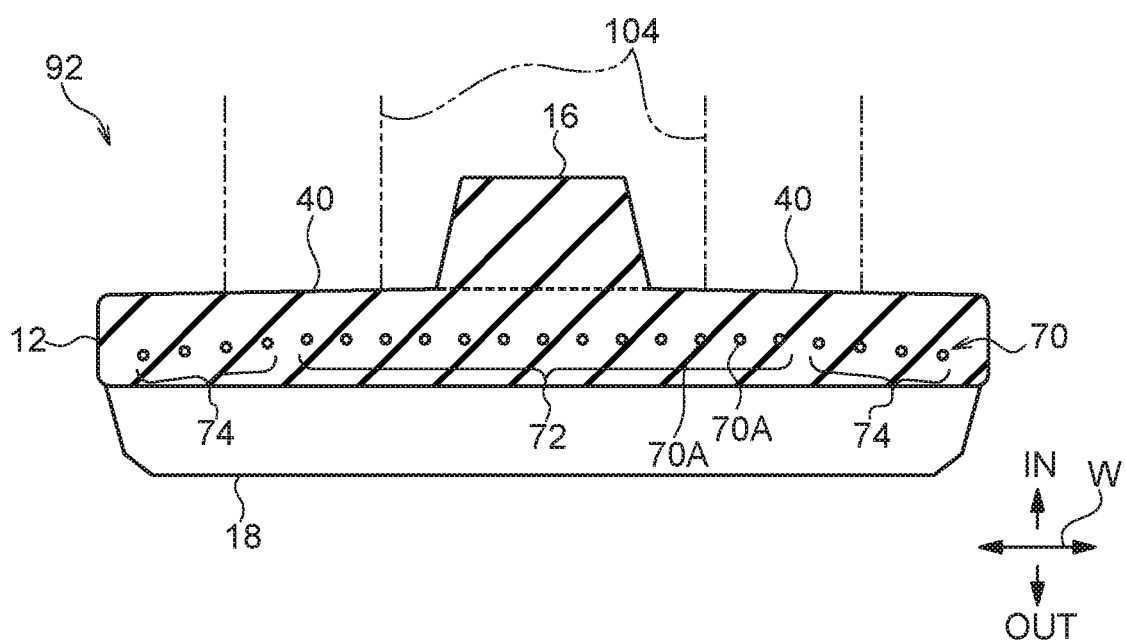
FIG. 2A is a lateral sectional diagram of the crawler according to the first exemplary embodiment of the present invention in a linear region.
Figure 2B:
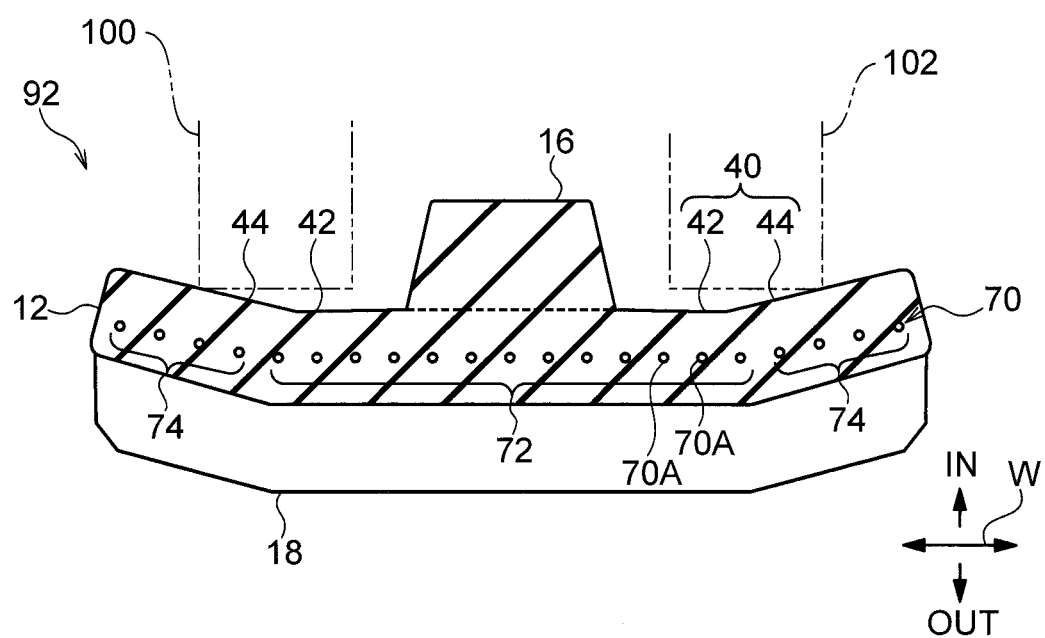
FIG. 2B is a lateral sectional diagram of the crawler according to the first exemplary embodiment of the present invention in a curved region.

As shown in FIG. 2A, the rubber crawler 92 includes a rubber crawler main body 12, the guide protrusions 16, the lugs 18, and a tensile body 70 inside the rubber crawler main body. In the present exemplary embodiment, the rubber crawler 92 is a coreless crawler that is not equipped with a core. FIG. 2A and FIG. 2B are lateral sectional diagrams along a plane orthogonal to an axis of the crawler turning direction of the rubber crawler 92 according to the first exemplary embodiment.

(Guide Protrusions)

The guide protrusions 16 serve as an example of guide protrusions of the present invention. As illustrated in FIG. 2A, the guide protrusions 16 are rubber protrusions with quadrangular pyramid shapes that are molded integrally with the rubber crawler main body 12. The guide protrusions 16 are formed with a constant pitch (spacing) in the crawler turning direction at a middle portion of the inner peripheral face of the rubber crawler main body 10. The guide protrusions 16 mesh with the pin portions of the driving wheel 100 and transmit driving force from the crawler vehicle to the rubber crawler 92. The guide protrusions 16 are disposed at the middle of the rolling wheels 104 that roll on the wheel rolling surfaces 40 described below. The guide protrusions 16 abut against side faces of the driving wheel 100, the idling wheel 102 and the rolling wheels 104. Thus, the guide protrusions 16 limit movements of the rubber crawler 92 in the crawler width direction.

(Rubber Crawler Main Body)

Figure 4:
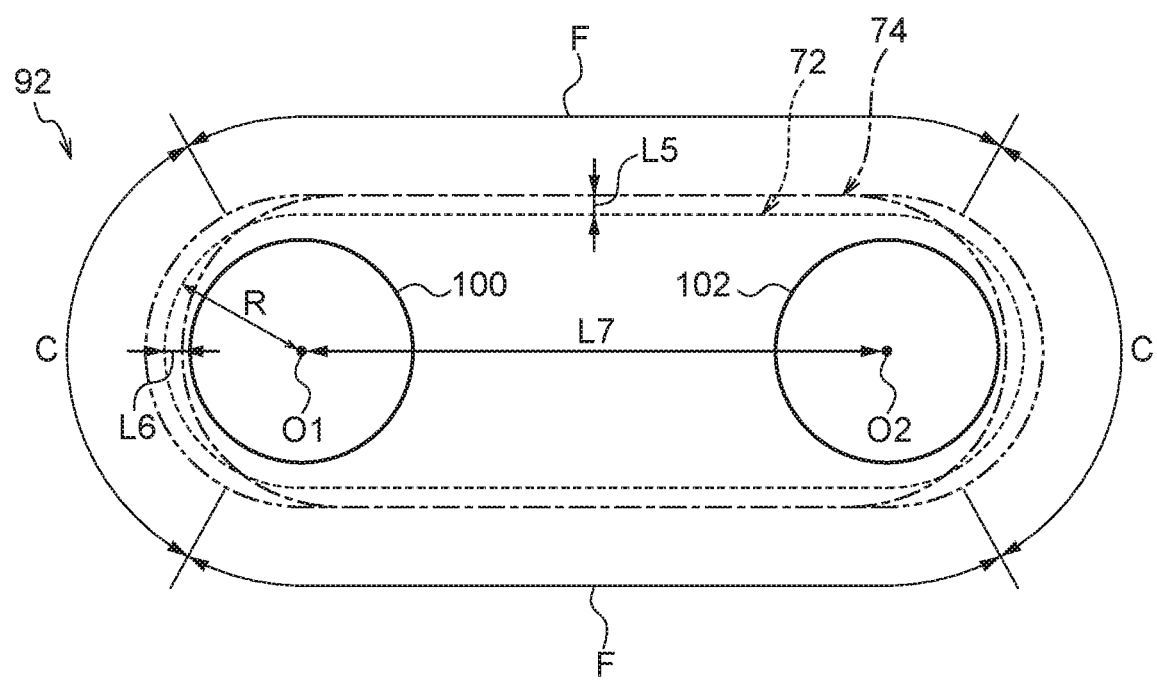
FIG. 4 is a side diagram showing states of slanting portions, crawler width direction outer side end portions and flat portions of the crawler according to the first exemplary embodiment or second exemplary embodiment of the present invention.

As shown in FIG. 2A, FIG. 2B and FIG. 4, the rubber crawler main body 12 is a rubber belt in which a rubber member is formed into an endless belt shape. The wheel rolling surfaces 40 are formed at each of two sides in the crawler width direction of the guide protrusions 16 (the inner peripheral faces at the left and right of the drawings in FIG. 2A and FIG. 2B). The wheel rolling surfaces 40 are parallel to the crawler width direction. The driving wheel 100, the idling wheel 102 and the rolling wheels 104 roll on the wheel rolling surfaces 40.

(Tensile Body)

As shown in FIG. 2A and FIG. 2B, the tensile body 70 is a structure in which main cords 70A are wound into helical shapes along the crawler turning direction and arrayed equidistantly in the crawler width direction. The main cords 70A are embedded inside the rubber crawler main body 12 in a pre-stressed state. The tensile body 70 is provided with a flat portion 72 at the crawler width direction middle side and slanting portions 74 at the crawler width direction outer sides relative to the flat portion 72.

In a section along the crawler width direction that is orthogonal to the crawler turning direction (as in, for example, FIG. 2A and FIG. 2B), the flat portion 72 is a region in which the main cords 70A are arrayed equidistantly along the crawler width direction. The flat portion 72 is formed across a middle portion of the rubber crawler 92. End portions of the flat portion 72 are disposed at crawler width direction outer sides relative to the guide protrusions 16.

In the section along the crawler width direction that is orthogonal to the crawler turning direction (as in, for example, FIG. 2A and FIG. 2B), each slanting portion 74 is a region in which the main cords 70A are arrayed equidistantly in a direction that is inclined with respect to the crawler width direction. In linear regions F as seen in a side view of the rubber crawler 92 (regions other than regions in which the rubber crawler 92 is wrapped around the driving wheel 100 and the idling wheel 102; see FIG. 4), each slanting portion 74 is slanted toward the crawler outer peripheral side, as shown in FIG. 2A.

In curved regions C as seen in the side view of the rubber crawler 92 (the regions that are wrapped around the driving wheel 100 and the idling wheel 102; see FIG. 4), each slanting portion 74 is slanted toward the crawler inner peripheral side, as shown in FIG. 2B. A position at which the slanting of the slanting portion 74 shifts from the crawler outer peripheral side to the inner peripheral side does not necessarily coincide with the position of an end portion of wrapping of the rubber crawler 92 onto the driving wheel 100 or idling wheel 102. It is sufficient if the slanting portion 74 is provided at least with regions that are slanted toward the crawler outer peripheral side in the linear regions F and regions that are slanted toward the crawler inner peripheral side in the curved regions C.

A crawler turning direction length of the tensile body 70 is constant over the crawler width direction. That is, crawler turning direction lengths of the slanting portions 74 are the same as the crawler turning direction length of the flat portion 72. In other words, lengths of the main cords 70A of the slanting portions 74 over a full turn in the crawler turning direction are equal to lengths of the main cords 70A of the flat portion 72 over a full turn in the crawler turning direction. As a result, a crawler width direction outer side end portion 74A of each slanting portion 74, as depicted by, for example, the single-dot chain line in FIG. 4, is disposed at the crawler outer peripheral side relative to the flat portion 72, as depicted by the dotted line in FIG. 4, in the linear regions F, and the crawler width direction outer side end portion 74A of the slanting portion 74 is disposed at the crawler inner peripheral side relative to the flat portion 72 in the curved regions C. Note that the meanings of the terms "constant", "the same" and equal do not necessarily refer to states that perfectly match but can include differences of around ±1% in the lengths over a full turn in the crawler turning direction. Note also that the term "lengths over a full turn in the crawler turning direction" refers to lengths along the main cords 70A from an arbitrary sectional plane along the crawler width direction orthogonal to the crawler turning direction (for example, the section shown in FIG. 2A) to the same sectional plane. That is, these lengths refer to overall lengths of the main cords 70A if the tensile body 70 were cut at that sectional plane.

As shown in FIG. 4, in each linear region F as seen in the side view of the rubber crawler 92, if a distance between the crawler width direction outer side end portion of the slanting portion 74 and the flat portion 72 (an outer side slant height) is represented by L5, and a distance between a rotation axis O1 of the driving wheel 100 and a rotation axis O2 of the idling wheel 102 (an inter-axis distance) is represented by L7, then L5 is 0.35% of L7. Note that L5 is a measurement of distance between the crawler outer peripheral side end of an arbitrary main cord 70A of the flat portion 72 and the crawler outer peripheral side end of the main cord 70A that is at the crawler width direction outer side end portion of the slanting portion 74, measured at a location through which a center line of a line joining the rotation axes O1 and O2 passes, as seen in the side view of the rubber crawler 92.

Steel cords that are embedded in order to reinforce tensile strength of the rubber crawler 92 in the crawler turning direction are employed as the main cords 70A constituting the tensile body 70 according to the present exemplary embodiment. Each steel cord is structured by a plural number of strands being twisted together. Each strand is formed by a plural number of filaments being twisted together. As a result, tensile strength of the rubber crawler 92 with respect to the crawler turning direction is raised.

The present invention is not limited to this structure. As long as sufficient tensile strength is provided, cords constituted with organic fibers (for example, nylon fibers, aromatic polyamide fibers or the like) may be used as the main cords.

In the present exemplary embodiment, only the tensile body 70 is embedded inside the rubber crawler main body 12, but the present invention is not limited by this structure. Structures are possible in which reinforcing cords that intersect with the tensile body 70 as seen from the crawler inner peripheral side or the crawler outer peripheral side are arrayed in the crawler turning direction at one or both of the crawler inner peripheral side and outer peripheral side of the tensile body 70.

The main cords 70A according to the present invention are wound into helical shapes along the crawler turning direction. However, structures are possible in which a plural number of main cords are arrayed along the crawler turning direction (arranged in parallel in the crawler width direction).

(Lugs)

As illustrated in FIG. 2A, the lugs 18 are rubber protrusions molded integrally with the rubber crawler main body 12. The lugs 18 are formed at the outer peripheral face of the rubber crawler main body 12 with a constant pitch in the crawler turning direction. The lugs 18 are disposed at the crawler outer peripheral side of the wheel rolling surfaces 40. The lugs 18 are portions of the rubber crawler 92 that make contact with the ground surface.

(Operation)

According to the rubber crawler 92 of the first exemplary embodiment, when the slanting portions 74 are disposed in a linear region F (see FIG. 4), the wheel rolling surfaces 40 at the inner peripheral side of the rubber crawler main body 12 are parallel with the crawler width direction, as shown in FIG. 2A.

When the rubber crawler 92 turns and the slanting portions 74 of the tensile body 70 move from a linear region F to a curved region C, the slanting portions 84 are slanted from the crawler outer peripheral side to the inner peripheral side, as illustrated in FIG. 2B. Therefore, the crawler width direction end portions of the tensile body 70 move greatly toward the crawler inner peripheral side and the tensile body 70 inflects the rubber crawler main body 12 toward the crawler inner peripheral side. Here, a maximum slant angle of each slanting portion 84 with respect to the crawler width direction is 2.5° to 5.8° toward the crawler inner peripheral side. As a result, in each wheel rolling surface 40 at the inner peripheral side of the rubber crawler main body 12, a slanted surface 44 is formed at the crawler width direction outer side of a flat surface 42 at the crawler width direction middle side. Here, a maximum slant angle of the slanted surface 44 of each wheel rolling surface 40 with respect to the crawler width direction is 2.5° to 7.5° toward the crawler inner peripheral side. The slanted surfaces 44 touch against the driving wheel 100 or idling wheel 102.

If the rubber crawler 92 starts to meander, relative positions of the driving wheel 100 and idling wheel 102 relative to the rubber crawler main body 12 in the crawler width direction are offset. Thus, the driving wheel 100 and idling wheel 102 press against the slanted surface 44 that is formed at the inner peripheral face of the rubber crawler main body 12 at one side in the crawler width direction. Correspondingly, the crawler outer peripheral side of the slanted surface 44 that is a resilient body pushes against the tensile body 70, as a result of which tension is produced in the tensile body 70 at the one side in the width direction of the rubber crawler main body, and a difference in tension is produced between the width direction inner side of the rubber crawler main body 12 and the outer side at the one side. Accordingly, the rubber crawler main body 12 moves toward the one side of the crawler width direction, at which the tension is higher, so as to eliminate the tension difference in the tensile body 70. As a result, the relative positions of crawler width direction centers of the driving wheel 100 and idling wheel 102 align with the width direction center of the rubber crawler main body 12. Thus, meandering of the rubber crawler 92 may be suppressed. Moreover, because meandering of the rubber crawler 92 is suppressed, contact between the rolling wheels 104 and the side faces of the guide protrusions 16 formed at the width direction middle portion of the rubber crawler 92 is moderated, and damage to the guide protrusions 16 is suppressed.

The outer side slant height L5 of each slanting portion 74 of the tensile body 70 in a linear region F is set to 0.35% of the distance L7 between the rotation axis O1 of the driving wheel 100 and the rotation axis O2 of the idling wheel 102 (the inter-axis distance). As a result, each slanting portion 74 in a curved region C touching against the driving wheel 100 or idling wheel 102 forms a structure with an inner side slant height L6 (a distance between the crawler width direction outer side end portion of the slanting portion 74 and the flat portion in the curved region C) that is sufficient to push the guide protrusions 16 back to the middle of the rolling wheels 104.

Although the outer side slant height L5 is set to 0.35% of the inter-axis distance L7 in the present exemplary embodiment, configurations of the present invention are not limited thus. It is sufficient if the outer side slant height L5 is at least 0.3% of the inter-axis distance L7. If the outer side slant height L5 is less than 0.1% of the inter-axis distance L7, the slanting portions 74 in the curved region C touching against the driving wheel 100 or idling wheel 102 do not form structures with an inner side slant height sufficient to push the guide protrusions 16 back to the middle of the rolling wheels 104, and the effect of suppressing meandering of the rubber crawler 92 may be weakened.

In the linear region F, because the rolling wheels 104 roll on the wheel rolling surfaces 40 that are parallel to the crawler width direction, localized forces applied to the crawler inner peripheral face from the rolling wheels 104 may be moderated compared to a crawler in which the whole of a wheel rolling surface is a slanted face. Consequently, damage to the crawler inner peripheral face is suppressed.

During running of the crawler vehicle, when the rubber crawler 92 is wrapped onto the driving wheel 100 and idling wheel 102, end portions of the lugs 18 at the crawler outer peripheral side are pulled in to the crawler inner peripheral side by the slanting portions 74 of the tensile body 70. As a result, the lugs 18 move toward the crawler inner peripheral side. Thus, dirt, stones and the like caught on the lugs 18 may be caused to drop off.

Second Exemplary Embodiment

Below, a rubber crawler 94 that serves as an example of a resilient crawler according to a second exemplary embodiment is described with reference to the drawings. Portions that have the same structures as in the first exemplary embodiment are assigned the same reference numerals and are not described.

(Rubber Crawler Main Body)

Figure 3A:
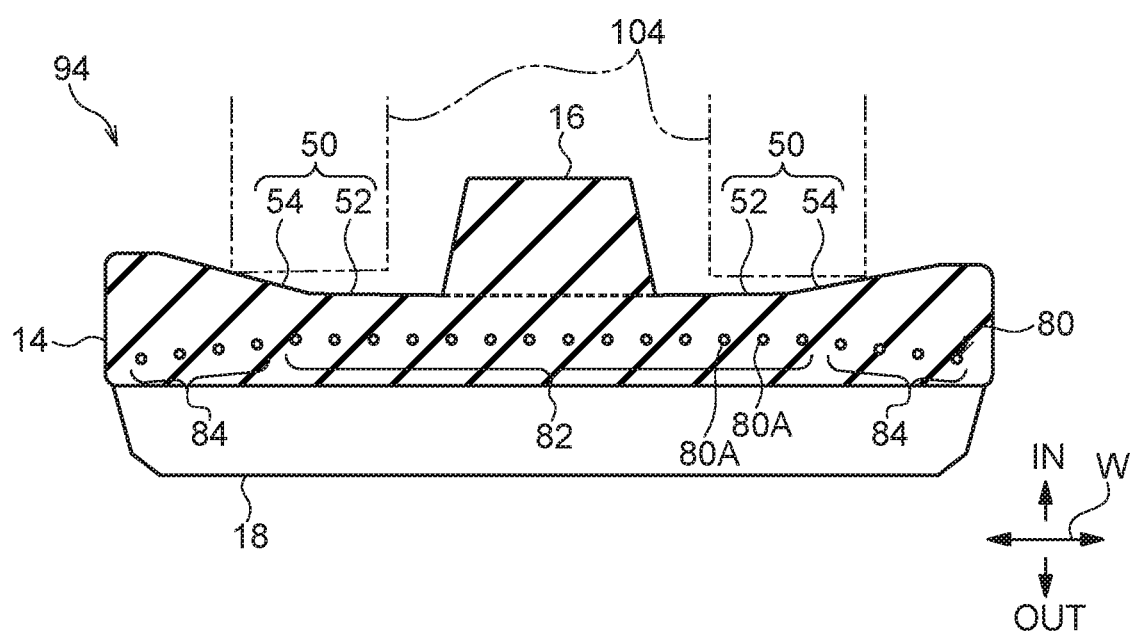
FIG. 3A is a lateral sectional diagram of a crawler according to a second exemplary embodiment of the present invention in a linear region.
Figure 3B:
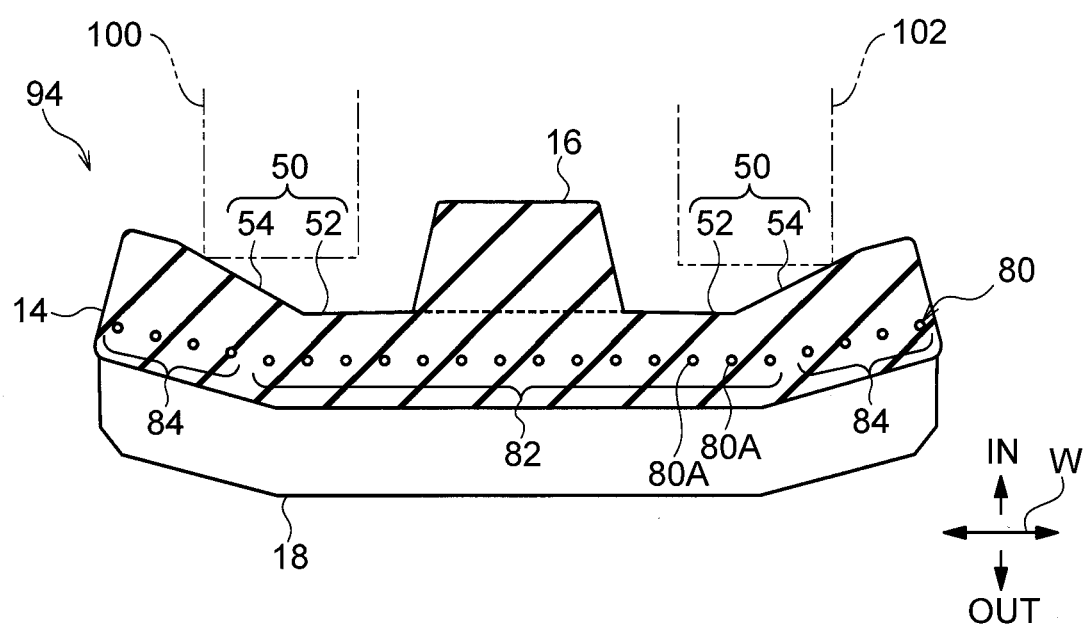
FIG. 3B is a lateral sectional diagram of the crawler according to the second exemplary embodiment of the present invention in a curved region.

As shown in FIG. 3A and FIG. 3B, a rubber crawler main body 14 is a rubber belt in an endless belt shape, Wheel rolling surfaces 50 are formed at each of two sides in the crawler width direction of the guide protrusions 16 (the inner peripheral faces at the left and right of the drawing in FIG. 3A). The driving wheel 100, the idling wheel 102 and the rolling wheels 104 roll on the wheel rolling surfaces 50.

Each wheel rolling surface 50 is structured by a flat surface 52 and a slanted surface 54. The flat surface 52 is formed at the crawler width direction outer side of the guide protrusions 16. The slanted surface 54 is formed at the crawler width direction outer side of the flat surface 52, and is slanted such that the thickness of the rubber crawler main body 14 gradually increases toward the crawler width direction outer side. The crawler width direction outer side of the rubber crawler main body 10 is formed with a flat surface from an end edge of the slanted surface 54. Thus, the thickness of an end portion of the rubber crawler main body 14 is constant. The flat surface 52 and slanted surface 54 are equivalent structures to, respectively, the flat surface 42 and slanted surface 44 of the wheel rolling surface 40 according to the first exemplary embodiment.

In FIG. 3A, in order to explain the structure of the rubber crawler 94, a state is illustrated in which each rolling wheel 104 touches only the slanted surfaces 54. However, the slanted surfaces 54 are pressed down by the rolling wheels 104 and deformed toward the crawler outer peripheral side to follow the shapes of the rolling wheels 104. Thus, the rolling wheels 104 also touch against the flat surfaces 52.

(Tensile Body)

As shown in FIG. 3A and FIG. 3B, a tensile body 80 is a structure in which main cords 80A are wound into helical shapes along the crawler turning direction, at equal intervals in the crawler width direction. The main cords 80A are embedded inside the rubber crawler main body 14. In the present exemplary embodiment, crawler width direction end portions of the tensile body 80 are disposed at crawler width direction outer sides relative to crawler width direction outer side end portions of the slanted surfaces 54 of the wheel rolling surfaces 50. The tensile body 80 is provided with a flat portion 82 at the crawler width direction middle side and slanting portions 84 at the crawler width direction outer sides relative to the flat portion 82.

The flat portion 82 is a region in which the main cords 80A are arrayed equidistantly along the crawler width direction. The flat portion 82 is formed across a middle portion of the rubber crawler 94. End portions of the flat portion 82 are disposed at the crawler width direction outer sides relative to the guide protrusions 16.

Each slanting portion 84 is a region in which the main cords 80A are arrayed equidistantly so as to be inclined with respect to the crawler width direction. In each linear region F as seen in a side view of the rubber crawler 94 (see FIG. 4), each slanting portion 84 is slanted toward the crawler outer peripheral side, as shown in FIG. 3A.

In each curved region C as seen in the side view of the rubber crawler 94 (a region that is wrapped around the driving wheel 100 or idling wheel 102; see FIG. 4), each slanting portion 84 is slanted toward the crawler inner peripheral side, as shown in FIG. 3B.

The crawler turning direction length of the tensile body 80 is constant over the crawler width direction. That is, crawler turning direction lengths of the slanting portions 84 are equal to the crawler turning direction length of the flat portion 82. As a result, a crawler width direction outer side end portion of each slanting portion 84, as depicted by, for example, the single-dot chain line in FIG. 4, is disposed at the crawler outer peripheral side relative to the flat portion 82, as depicted by the dotted line in FIG. 4, in the linear regions F, and the crawler width direction outer side end portion of the slanting portion 84 is disposed at the crawler inner peripheral side relative to the flat portion 82 in the curved regions C.

As shown in FIG. 4, in each linear region F as seen in the side view of the rubber crawler 94, if the distance (the outer side slant height) between the crawler width direction outer side end portion of the slanting portion 84 (a portion of the single-dot chain line) and the flat portion 82 (a portion of the dotted line) is represented by L5, and the distance between the rotation axis O1 of the driving wheel 100 and the rotation axis O2 of the idling wheel 102 (the inter-axis distance) is represented by L7, then L5 is 0.35% of L7.

(Operation)

According to the rubber crawler 94 of the second exemplary embodiment, as shown in FIG. 3A, when the slanting portions 84 are disposed in a linear region F, the rolling wheels 104 touch against the slanted surfaces 54 of the wheel rolling surfaces 50. The crawler width direction end portions of the tensile body 80 embedded inside the rubber crawler main body 14 are disposed at the crawler width direction outer sides relative to the crawler width direction outer side end portions of the slanted surfaces 54 of the wheel rolling surfaces 50. Therefore, if the rubber crawler 94 starts to meander, relative positions of the rolling wheels 104 and the rubber crawler main body 14 in the crawler width direction are offset. Thus, the rolling wheels 104 press against the slanted surface 54 at one side in the crawler width direction. Correspondingly, the crawler outer peripheral side of the slanted surface 54 that is a resilient body pushes against the tensile body 80, as a result of which tension is produced in the tensile body 80 at the one side of the crawler width direction, and a difference in tension is produced between the crawler width direction inner side and the outer side at the one side. Accordingly, the rubber crawler main body 14 moves toward the one side in the crawler width direction, at which the tension is higher, so as to eliminate the tension difference in the tensile body 80. As a result, the relative positions of the crawler width direction centers of the rolling wheels 104 align with the crawler width direction center of the rubber crawler main body 14. Thus, meandering of the rubber crawler 92 may be suppressed.

Because the rolling wheels 104 also touch against the flat surfaces 52, localized forces applied to the wheel rolling surfaces 50 from the rolling wheels 104 may be moderated compared to a structure in which the flat surfaces 52 are not provided. Consequently, damage to the wheel rolling surfaces 50 is suppressed.

When the rubber crawler 94 turns and the slanting portions 84 of the tensile body 80 move from a linear region F (see FIG. 4) to a curved region C (see FIG. 4), the slanting portions 84 are slanted from the crawler outer peripheral side to the inner peripheral side, as illustrated in FIG. 3B. Therefore, the crawler width direction end portions of the tensile body 80 move greatly toward the crawler inner peripheral side and the tensile body 80 inflects the rubber crawler main body 14 toward the crawler inner peripheral side. As a result, the slant angle of the slanted surface 54 is large and the guide protrusions 16 of the rubber crawler 94 are pushed back to the centers of the driving wheel 100 and idling wheel 102 by strong forces. Therefore, the effect of suppressing meandering of the rubber crawler 94 may be enhanced. Moreover, contact between the side faces of the guide protrusions 16 and the rolling wheels 104 is moderated, and the effect of suppressing damage to the guide protrusions 16 is enhanced.

As shown in FIG. 4, the outer side slant height L5 of each slanting portion 84 in a linear region F is set to 0.35% of the distance L7 between the rotation axis O1 of the driving wheel 100 and the rotation axis O2 of the idling wheel 102 (the inter-axis distance). As a result, each slanting portion 84 in a curved region C touching against the driving wheel 100 or idling wheel 102 forms a structure with an inner side slant height L6 (the distance between the crawler width direction outer side end portion of the slanting portion 84 and the flat portion in the curved region C) that is sufficient to push the guide protrusions 16 back to the middle of the rolling wheels 104.

Although the outer side slant height L5 is set to 0.35% of the inter-axis distance L7 in the present exemplary embodiment, configurations of the present invention are not limited thus. It is sufficient if the outer side slant height L5 is at least 0.1% of the inter-axis distance L7. If the outer side slant height L5 is less than 0.1% of the inter-axis distance L7, the slanting portions 84 in each curved region C touching against the driving wheel 100 or idling wheel 102 do not form structures with an inner side slant height sufficient to push the guide protrusions 16 back to the middle of the rolling wheels 104, and the effect of suppressing meandering of the rubber crawler 92 may be weakened.

In the foregoing, exemplary embodiments of the present invention have been illustrated and the exemplary embodiments have been described. However, these exemplary embodiments are examples and numerous modifications may be embodied within a scope not departing from the spirit of the invention. It will be clear that the technical scope of the present invention is not to be limited by these exemplary embodiments.

For example, in the exemplary embodiments described above, the crawler turning direction lengths of the slanting portions 74 are the same as the crawler turning direction length of the flat portion 72. That is, a result of subtracting the crawler turning direction length of the flat portion 72 from the crawler turning direction length of each slanting portion 74 is zero. However, exemplary embodiments of the present invention are not limited thus. For example, it is sufficient if the result of subtracting the crawler turning direction length of the flat portion from the crawler turning direction length of each slanting portion is less than $2\pi L5$, which is determined by the outer side slant height L5 described above.

In FIG. 4, if the radius of the flat portion in the curved region C is represented by R, then the crawler turning direction length of the flat portion (the dotted line) can be expressed by $2\pi R + 2L7$. If the distance between the crawler width direction outer side end portion of each slanting portion and the flat portion in each linear region F—which is to say the thickness L5 from an imaginary plane projected in the width direction of the crawler main body from the flat portion to the width direction outer side end edge of the crawler main body—were to be maintained in each curved region C too (the two-dot chain line in FIG. 4), the circumferential length of the width direction outer end edge of the crawler main body at the slanting portion would be expressed by $2\pi(R+L5) + 2L7$. In this case, the result of subtracting the circumferential length of the flat portion from the circumferential length of the crawler width direction outer end edge of each slanting portion would be expressed by $2\pi L5$. If the result of subtracting the crawler turning direction length of the flat portion from the crawler turning direction length of each slanting portion is less than $2\pi L5$, which is determined by the aforementioned outer side slant height L5, then the thickness in the curved region C from the imaginary plane projected in the width direction of the crawler main body from the flat portion to the width direction outer end edge of the crawler main body is smaller than L5. To explain this using FIG. 4, in the curved region C, the crawler width direction outer end edge of the slanting portion is disposed at the crawler inner peripheral side relative to the positions represented by the two-dot chain line. Therefore, when the crawler turns and the slanting portions of the tensile body move from a linear region F to a curved region C, the width direction end portions of the crawler main body are pulled in to the inner peripheral side of the crawler main body and inflected, and the inner peripheral faces of the width direction end portions of the crawler main body are slanted towards the inner peripheral side of the crawler main body. As a result, meandering of the crawler may be suppressed.

In the exemplary embodiments described above, the rubber crawlers 92 and 94 in which rubber members are formed into endless belt shapes serve as examples of the crawler of the present invention, but the present invention is not limited by these structures. A belt-shaped member in which an elastomer or the like rather than a rubber is formed into an endless belt shape may be used.

In the exemplary embodiments described above, the crawler width direction end portions of the tensile body 80 are disposed at the crawler width direction outer sides relative to the crawler width direction outer side end portions of the slanted surfaces 54 of the wheel rolling surfaces 50, but embodiments of the present invention are not limited thus. For example, it is sufficient if the crawler width direction end portions of the tensile body are disposed at the crawler outer peripheral sides of the slanted surfaces 54 of the wheel rolling surfaces 50. Provided the crawler width direction end portions of the tensile body are disposed at the crawler outer peripheral sides of the slanted surfaces 54 of the wheel rolling surfaces 50, tension is produced in the tensile body when the crawler starts to meander, and thus meandering of the crawler may be suppressed.

In the exemplary embodiments described above, the rubber crawler 92 or 94 is configured such that the pin portions formed at the wheel portions 100A of the driving wheel 100 engage with the guide protrusions 16 and transmit driving force from the crawler vehicle, but exemplary embodiments of the present invention are not limited thus. For example, a frictional driving-type rubber crawler may be configured in which the outer peripheral surfaces 100B of the driving wheel 100 touch against inner peripheral surfaces (the wheel rolling surfaces 40 or 50) of the rubber crawler and transmit driving by friction.

The disclosures of Japanese Patent Application No. 2015-114711 filed Jun. 5, 2015 are incorporated into the present specification by reference in their entirety. All references, patent applications and technical specifications cited in the present specification are incorporated by reference into the present specification to the same extent as if the individual references, patent applications and technical specifications were specifically and individually recited as being incorporated by reference.

The invention claimed is:

1. A crawler comprising:
 a crawler main body formed by a resilient body having an endless belt shape;
 a tensile body that is wound along a longitudinal direction of the crawler main body and is embedded in the crawler main body, the tensile body including, in a sectional view of a thickness direction of the crawler main body:
 a planar portion that is arranged along a width direction of the crawler main body, and
 a slanting portion that is present at a width direction outer side of the crawler main body and that slants relative to the planar portion, the slanting portion: (a) slanting toward a crawler outer peripheral side in a linear region of the crawler main body as seen in a side view of the crawler, and (b) slanting toward a crawler inner peripheral side in a curved region of the crawler main body as seen in a side view of the crawler main body;
 guide protrusions that are formed at an inner peripheral face of the crawler main body at a width direction middle portion of the crawler main body, the guide protrusions being formed at intervals in the longitudinal direction of the crawler main body; and
 a planar surface on which a roller wheel of a vehicle rolls, the planar surface being formed at the inner peripheral face of the crawler main body at the width direction outer side of the crawler main body relative to the guide protrusions,
 wherein, in the linear region of the crawler main body as seen in a side view of the crawler main body, if a thickness from an imaginary plane projected in the width direction of the crawler main body from the planar portion to an end edge of the slanting portion at the width direction outer side of the crawler main body is represented by L, then a result of subtracting a longitudinal direction length of the crawler main body at the planar portion from a longitudinal direction length of the crawler main body at the slanting portion is less than $2\pi L$,
 the crawler further comprises a side surface that is formed at the width direction outer side of the crawler main body, the side surface extends along the thickness direction of the crawler main body in the linear region of the crawler main body as seen in the side view of the crawler, and the side surface slants in the curved region of the crawler main body as seen in the side view of the crawler main body so that an inner end of the side surface in the thickness direction of the crawler main body moves toward a width direction inner side of the crawler main body more than an outer end of the side surface in the thickness direction of the crawler main body, and
 the crawler further comprises a slanted surface that is formed at the crawler width direction outer side of the planar surface, and that slants relative to the planar surface so that an end portion at the width direction outer side of the crawler main body is thicker in the thickness direction of the crawler main body than a portion at the planar surface.

2. The crawler according to claim 1, wherein the crawler longitudinal direction length at the slanting portion is the same as the crawler longitudinal direction length at the planar portion.

3. The crawler according to claim 1, wherein, in the linear region as seen in the side view of the crawler main body, in a state in which the crawler main body is wrapped around a driving wheel and an idling wheel of the vehicle, a distance between the slanting portion at a width direction outer end portion of the crawler main body and the planar portion is at least 0.1% of a distance between rotation axes of the driving wheel and the idling wheel.

4. The crawler according to claim 1, wherein the crawler is a coreless crawler.

5. A crawler comprising:
 a crawler main body formed by a resilient body having an endless belt shape;
 a tensile body that is wound along a longitudinal direction of the crawler main body and is embedded in the crawler main body, the tensile body including, in a sectional view of a thickness direction of the crawler main body:
 a planar portion that is arranged along a width direction of the crawler main body, and
 a slanting portion that is present at a width direction outer side of the crawler main body and that slants relative to the planar portion, the slanting portion: (a) slanting toward a crawler outer peripheral side in a linear region of the crawler main body as seen in a side view of the crawler, and (b) slanting toward a crawler inner peripheral side in a curved region of the crawler main body as seen in a side view of the crawler main body;
 guide protrusions that are formed at an inner peripheral face of the crawler main body at a width direction middle portion of the crawler main body, the guide protrusions being formed at intervals in the longitudinal direction of the crawler main body; and
 a planar surface on which roller wheels of a vehicle roll, the planar surface being formed at the inner peripheral face of the crawler main body at the width direction outer side of the crawler main body relative to the guide protrusions, wherein, in the linear region of the crawler main body as seen in a side view of the crawler main body, if a thickness from an imaginary plane projected in the width direction of the crawler main body from the planar portion to an end edge of the slanting portion at the width direction outer side of the crawler main body is represented by L, then a result of subtracting a longitudinal direction length of the crawler main body at the planar portion from a longitudinal direction length of the crawler main body at the slanting portion is less than $2\pi L$, and the crawler further comprises a slanted surface that is formed at the crawler width direction outer side of the planar surface, and that slants relative to the planar surface so that an end portion at the width direction outer side of the crawler main body is thicker in the thickness direction of the crawler main body than a portion at the planar surface.

6. The crawler according to claim 5, wherein the crawler longitudinal direction length at the slanting portion is the same as the crawler longitudinal direction length at the planar portion.

7. The crawler according to claim 5, wherein, in the linear region as seen in the side view of the crawler main body, in a state in which the crawler main body is wrapped around a driving wheel and an idling wheel of the vehicle, a distance between the slanting portion at a width direction outer end portion of the crawler main body and the planar portion is at least 0.1% of a distance between rotation axes of the driving wheel and the idling wheel.

8. The crawler according to claim 5, wherein the crawler is a coreless crawler.

* * * * *